United States Patent
Vastmans et al.

(10) Patent No.: US 9,217,833 B2
(45) Date of Patent: Dec. 22, 2015

(54) POSITIONING MEANS FOR A FIBRE OPTIC CONNECTOR ASSEMBLY, A FIBRE OPTIC CONNECTOR ASSEMBLY AND FIBRE TERMINATION UNIT

(75) Inventors: Kristof Vastmans, Bouitersem (BE); Eric Schurmans, Hogen-Geetbets (BE); Kathleen Bellekens, Winksele Delle (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 229 days.

(21) Appl. No.: 13/394,016

(22) PCT Filed: Sep. 2, 2010

(86) PCT No.: PCT/EP2010/062863
§ 371 (c)(1),
(2), (4) Date: Mar. 2, 2012

(87) PCT Pub. No.: WO2011/026894
PCT Pub. Date: Mar. 10, 2011

(65) Prior Publication Data
US 2012/0170895 A1    Jul. 5, 2012

(30) Foreign Application Priority Data
Sep. 3, 2009 (EP) .................................. 09011300

(51) Int. Cl.
*G02B 6/38* (2006.01)
*H01R 13/74* (2006.01)
*G02B 6/44* (2006.01)

(52) U.S. Cl.
CPC ............ *G02B 6/3897* (2013.01); *G02B 6/4439* (2013.01); *G02B 6/3821* (2013.01); *G02B 6/3825* (2013.01); *G02B 6/3849* (2013.01); *G02B 6/3893* (2013.01)

(58) Field of Classification Search
CPC .................................... G02B 6/38; G02B 6/00
USPC ....................................................... 385/78, 52
See application file for complete search history.

(56) References Cited

U.S. PATENT DOCUMENTS 3,880,163 A * 4/1975 Ritterskamp .................. 604/136
4,611,887 A * 9/1986 Glover et al. ................... 385/71
(Continued)

FOREIGN PATENT DOCUMENTS

EP          0335531 A2    10/1989
EP          0485196 A2    5/1992
(Continued)

OTHER PUBLICATIONS

International Search Report and Written Opinion issued by the European Patent Office, Rijswijk, Netherlands, dated Nov. 30, 2011, for related International Application No. PCT/EP2010/062863; 15 pages.

(Continued)

*Primary Examiner* — Kaveh Kianni
(74) *Attorney, Agent, or Firm* — Faegre Baker Daniels LLP (57) ABSTRACT

The present invention relates to a positioning means for a fiber optic connector assembly, a fiber optic connector assembly and a fiber termination unit comprising the positioning means through which manufacturing tolerances can be absorbed to provide an improved optical interconnection with a high signal transmission rate. The positioning means (1) comprises a receiving means (5) for receiving one of a jack assembly or plug assembly (2) and a stationary support (6) supporting said receiving means (5), wherein the receiving means (5) is displaceable to a certain extent relative to the stationary support (6) at least along one direction other than a connection direction for optically interconnecting the optical fibers allowing an alignment of the receivable jack or plug assembly (2) along the direction transversal to the connection direction. A spring loaded element (8) resiliently urges said receiving means (5) away from the support (6) in one embodiment.

9 Claims, 8 Drawing Sheets

(56) References Cited

U.S. PATENT DOCUMENTS

| | | | |
|---|---|---|---|
| 5,076,656 A * | 12/1991 | Briggs et al. | 385/71 |
| 5,280,552 A * | 1/1994 | Yokoi et al. | 385/78 |
| 5,363,459 A * | 11/1994 | Hultermans | 385/60 |
| 5,673,346 A | 9/1997 | Iwano et al. | |
| 5,719,977 A * | 2/1998 | Lampert et al. | 385/60 |
| 5,873,746 A * | 2/1999 | Morlion et al. | 439/247 |
| 5,921,796 A * | 7/1999 | Morlion et al. | 439/247 |
| 6,058,235 A | 5/2000 | Hiramatsu et al. | |
| 6,097,873 A * | 8/2000 | Filas et al. | 385/140 |
| 6,132,104 A | 10/2000 | Bliss et al. | |
| 6,227,718 B1 | 5/2001 | Harvey et al. | |
| 6,692,159 B2 * | 2/2004 | Chiu et al. | 385/53 |
| 7,733,643 B1 * | 6/2010 | Rumpf | 361/679.43 |
| 7,744,286 B2 * | 6/2010 | Lu et al. | 385/53 |
| 8,414,196 B2 * | 4/2013 | Lu et al. | 385/60 |
| 2001/0026661 A1 * | 10/2001 | de Jong et al. | 385/56 |
| 2002/0191919 A1 * | 12/2002 | Nolan | 385/78 |
| 2003/0180004 A1 * | 9/2003 | Cox et al. | 385/53 |
| 2004/0223701 A1 * | 11/2004 | Tanaka et al. | 385/55 |
| 2005/0078914 A1 | 4/2005 | Cox | |
| 2006/0093301 A1 | 5/2006 | Zimmel et al. | |
| 2007/0160327 A1 * | 7/2007 | Lewallen et al. | 385/53 |
| 2008/0056647 A1 * | 3/2008 | Margolin et al. | 385/89 |
| 2008/0298751 A1 | 12/2008 | Shiratori et al. | |
| 2009/0275224 A1 * | 11/2009 | Ni et al. | 439/131 |
| 2010/0034502 A1 * | 2/2010 | Lu et al. | 385/60 |
| 2010/0202736 A1 * | 8/2010 | Roth | 385/59 |
| 2010/0290741 A1 * | 11/2010 | Lu et al. | 385/60 |
| 2010/0310213 A1 * | 12/2010 | Lewallen et al. | 385/75 |
| 2013/0068322 A1 * | 3/2013 | Kock et al. | 137/468 |

FOREIGN PATENT DOCUMENTS

| | | |
|---|---|---|
| EP | 1180701 A1 | 2/2002 |
| EP | 1548476 A2 | 6/2005 |
| JP | 10133030 A | 5/1998 |
| JP | 2002026549 A | 1/2002 |

OTHER PUBLICATIONS

International Preliminary Report on Patentability, issued by the International Bureau of WIPO, Geneva, Switzerland, dated Mar. 6, 2012, for International PCT Application No. PCT/EP2010/062863; 9 pages.

* cited by examiner

POSITIONING MEANS FOR A FIBRE OPTIC CONNECTOR ASSEMBLY, A FIBRE OPTIC CONNECTOR ASSEMBLY AND FIBRE TERMINATION UNIT

The present invention relates to a positioning means for a fibre optic connector assembly, a fibre connector assembly and a fibre termination unit used mainly in the technical field of broad band network architecture where optical fibres replace at least parts of the metal loop used commonly for last mile telecommunications.

In last mile telecommunications, an interface such as the fibre termination unit (FTU) between a provider side and a customer side is required for converting an optical signal received from the provider side and transmitted to the customer side by converting said optical signal into an electrical signal and vice versa. Said interface generally comprises a panel or motherboard receiving the optical fibre to provide a first optical fibre connection part and a circuit board fixed to said panel or motherboard and to provide a second optical fibre connection part connected to said first optical fibre connection part for optically interconnecting the optical fibre elements received in said connection parts, respectively. The optical signal is transmitted from the panel or motherboard to the circuit board and converted into the electrical signal by e.g. a transceiver mounted on said circuit board. Said optical fibre connection parts typically comprise a jack assembly holding a jack ferrule and a plug assembly holding a plug ferrule, respectively. Said optical fibre connection parts are pre-aligned on the boards by means of stationary positioning means holding said optical fibre connection parts such that, after securing one board to the other, the jack ferrule automatically receives the plug ferrule to optically interconnect the optical fibre elements surrounded by said ferrules, respectively. It is important that the alignment of the optical fibre connection parts receiving the ferrules is as precise as possible and that a gap between opposing end surfaces of connected optical fibre elements is avoided and remains constant to ensure a high signal transmission rate even after optical interconnection. This is solved in the prior art by springs mounted in the plug assembly and the jack assembly to absorb a small misalignment in axial positions of the opposing ferrule tips and to maintain consistent pressure against the ferrules in the interconnected state.

An additional difficulty arises in board to board connections, particularly when at least two optical fibre connectors held by positioning means which are spaced apart from one another with a predetermined distance are interconnected simultaneously. Due to the manufacturing process of at least the panel/motherboard, which is generally formed by injection molding involving respective manufacturing tolerances, the space between adjacent positioning means holding the optical fibre connector parts on the motherboard can differ from the spacing of the corresponding opposing positioning means holding the respective other optical fibre connector parts provided with the circuit board. Said misalignment will increase with the number of optical fibre connectors, i.e. the positioning means provided for the interface. Accordingly, an optical connection from board to board can often only be achieved with certain difficulties.

An additional problem arises from the connection of the plug assembly to the jack assembly which is generally performed by the board-to-board connection. Although said plug assembly and said jack assembly comprise corresponding latching means for securing the optical interconnection of the optical fibre elements, it cannot be ensured that after connecting the boards, said latching means also engage with each other and that a reliable optical interconnection of the optical fibre elements is achieved. Because tolerances of the boards and the fibre optic connector assembly caused by its manufacturing process and assembling process also exist along a connection axis of the boards and assembly, it is possible that the corresponding latching means of the jack assembly and the plug assembly are not in a latching engagement position although the boards are secured to each other. An abutment of the opposing end surfaces of the optical fibre elements received by the respective ferrules is prevented which results in a signal transmission loss and a decreased signal transmission rate.

EP 0 650 602 B1 discloses a fibre optic connector assembly dealing with the problem of axial misalignment, particularly with the problem caused by springs provided in the jack assembly and the plug assembly. Said conventional art proposes a fibre optic connector assembly comprising a jack assembly provided with thrust disengagement means in the form of actuator ribs sliding between camming members of the plug assembly. Thereby, a load on the boards involved by the known configuration of the jack assembly and the plug assembly having springs as described above can be avoided. Accordingly, the boards can be moved to each other without any resistance, thereby allowing a tolerance in the axial spacing between the boards. However, the foresaid fibre optic connector assembly also has the problem as described before.

An object of the present invention is to solve the problems of the conventional art. Specifically, an object of the present invention is to provide a positioning means for a fibre optic connector assembly dealing with the tolerance issues of the fibre optic connector assembly and the boards for providing an improved optical interconnection with a high signal transmission rate and to provide a fibre optic connector assembly and a fibre termination unit comprising such a positioning means.

The aforesaid objective is solved by a positioning means for a fibre optic connector assembly having the features of claim 1. Said positioning means comprises a receiving means for receiving one of a jack assembly receiving a jack ferrule or plug assembly receiving a plug ferrule. In the sense of the present invention, a plug assembly corresponds on a general basis to one or more means capable of receiving a signal transmitting element, e.g. an optical fibre element supported by a ferrule to provide a male contact part, wherein the optical fibre element is received within a jacket of an optical cable and is provided for transmitting the optical signal. The jack assembly refers to any means adapted to receive a further signal transmitting element, e.g. a further optical fibre element supported by a further ferrule to provide a female contact part, which is connectable to the male contact part of the fibre optical element supported by the plug ferrule received in the plug assembly. On a contact side of the plug assembly and of the jack assembly, the jacket is generally, but not necessarily removed to expose the optical fibre element and the ferrule supports said exposed optical fibre element. A ferrule refers generally to a means adapted to align the signal transmitting element, preferably in a central part of the plug assembly and the jack assembly, respectively, for allowing a signal connection of the signal transmitting elements, i.e. an optical interconnection between the optical fibre elements received by said plug assembly and jack assembly. On a general basis, a ferrule in the meaning of the invention be any means suitable to make the free end of the signal transmitting element such as the optical fibre element handleable for signal connection, i.e. optical connection. The jack assembly does not necessarily be formed of one piece. The jack assembly can comprise at least two parts, wherein one part can be formed of a further plug assembly and wherein the second part can provide an adapter for receiving both plug assemblies to allow an optical interconnection between the optical fibre elements received in the plug assemblies. In other words, the adapter, which can be formed of one or more parts, can have two accessible sides directing in opposing directions, wherein one side of the adapter provides a female connector part for receiving the plug assembly from said one side and wherein the other side provides a further female connector part for receiving the further plug assembly from said other side, whereby an optical interconnection of the optical fibre elements received in the plug assemblies is obtained in an assembled state thereof with the adapter. The positioning means comprises further a stationary support supporting said receiving means, wherein said receiving means is displaceable to a certain extent relative to the stationary support at least along one direction other than a connection direction for optically interconnecting the optical fibres. Accordingly, one of opposing positioning means, which are conventionally provided stationary on the boards, is replaced with a positioning means having one free end opposing the corresponding other positioning means, wherein the free end is displaceable at least along one direction running transverse to the connection direction to interconnect the plug and jack assembly received by said displaceable positioning means and the opposed positioning means, respectively. The connection direction refers to the direction for connecting the jack assembly to the plug assembly and also to the direction for connecting the plug assembly to the jack assembly. In other words, regardless of the moving direction of the jack assembly or plug assembly, the connection direction remains consistent with a connection axis comprising the opposing connection directions of the jack assembly and of the plug assembly and generally extends parallel to the optical fibres held by the jack assembly or the plug assembly, respectively. This also applies for the displacement of the receiving means relative to the stationary support at least along one direction, wherein said one direction remains consistent with an axis comprising said one direction and its opposing direction. Accordingly, the receiving means is displaceable, i.e. movable, to a certain extent relative to the stationary support in a first direction and in a second direction opposing the first direction, wherein said first and second directions run transversally to the connection direction.

Based on said displaceable positioning means, a misalignment of the opposing positioning means either axially or transverse thereto can be easily absorbed by moving or displacing said displaceable positioning means to a position where the axes of the optical fibre elements received in the positioning means are aligned with each other.

Preferred embodiments of the inventive positioning means are subject to dependent claims 2 to 8.

In one of the preferred embodiments, the stationary support movably supports the receiving means and, more preferable, resiliently supports said receiving means additionally along the connection direction, wherein, further preferable, the stationary support and the receiving means enclose a spring loaded element which consistently presses/guides the receiving means along the connection direction and away from the stationary support, wherein said stationary support comprises a stop means and wherein the spring loaded element guides the receiving means in a spring loaded state to the stop means in a distal end position. The spring loaded element is preferably formed of a compression spring. Generally, the spring loaded element can be formed of any flexible element providing a compression force in the connection direction against the receiving means for urging said receiving means to a forward position, wherein the stop means stops the move of the receiving means at the most forward position which corresponds to the distal end position. That is, the receiving means is moved by the spring loaded element away from a stationary position of the stationary support in the forward position away from the stationary support, wherein said receiving means is stopped and held in the distal end position by the stop means under a predetermined spring load. The path for moving back from said forward position to a rearward position of the receiving means which is a position nearer to the stationary position of the stationary support than the forward position, relates preferably to a distance compensating in the connection direction the tolerances, e.g. manufacturing tolerances of the positioning means and/or of the base on which said positioning means can be provided. Thereby, the connection of the jack assembly to the plug assembly and, in addition, the optical interconnection of the optical fibres supported by said assemblies can be further improved.

A further preferred embodiment comprises the stationary support which comprises a first key and slot structure extending parallel to the connection direction, and the receiving means which comprises a second key and slot structure engaging said first key and slot structure with a predetermined gap between opposing surfaces of the corresponding keys and slots. Preferably, the key and slot structure has a U-shape, wherein at least one journal forms the key, and the recess forms the slot, and wherein the slot of the respective key and slot structure receives the at least one journal of the corresponding one. In addition, the dimension of said key and slot structures is selected such that, in a received state of the journal in the recess, at least one surface side of the journal contacts its opposing surface side of the recess, for example with its complete surface area or at least partially with an edge between adjacent surface sides, wherein the remaining surface sides of the journal and the recess are preferably spaced from each other. The contact of the edge with its opposing surface can be obtained by a rotational move of the receiving means relative to the stationary support. The distance between respective opposing surface sides are set preferably to compensate for a misalignment of the positioning means in the axis corresponding to the axis running perpendicular to the planes comprising the surface sides, respectively. Accordingly, the receiving means is displaceable along said axis to an extent determined by said distance.

The aforesaid objective is also achieved by a fibre optic connector assembly as specified in claim 9.

Preferred embodiments of the inventive fibre optic connector assembly are subject to the dependent claims 10 to 12.

In a preferred embodiment of the inventive fibre optic connector assembly, the jack assembly and the plug assembly each comprises latching means insertable to each other for retaining the plug assembly in the jack assembly, wherein the spring loaded element provides a spring load higher than a latching force for effecting a latching connection of the plug assembly to the jack assembly. The spring loaded element provides a spring force counteracting against the latching force in the connecting direction. Hence, before the receiving means starts moving back to the rear position, the jack latching means engages the plug latching means thereby optically interconnecting the optical fibres received by said assemblies. Then, after a connection force to connect the positioning means higher than the spring load is applied to the positioning means, the receiving means starts moving back towards the rear position with the optical fibres in the optically interconnected state. Consequently, by observing the backward movement of the receiving means, it is possible to ensure that the optical fibres are definitely optical interconnected.

The above objective is likewise achieved by a fibre termination unit as defined in claim 13. Preferred embodiments of the inventive fibre termination unit are subject to the dependent claims 14 and 15.

A preferred embodiment of the present invention will now be described in more detail by way of example, with reference to the accompanying drawings, in which.

Figure 1A:
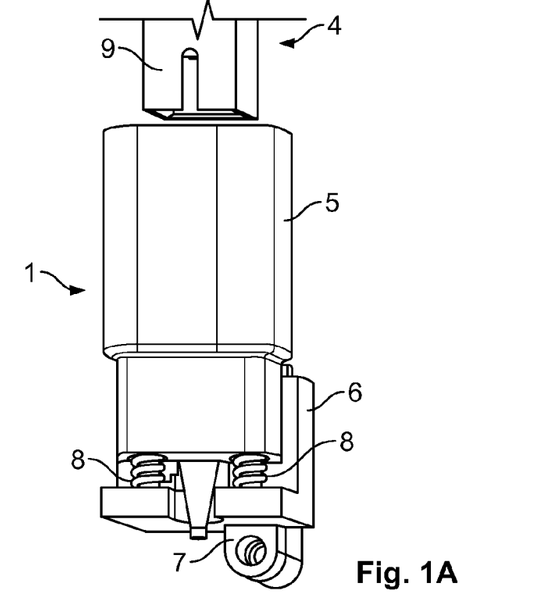
FIG. 1A shows a perspective top view of a fibre optic connector assembly comprising the positioning means according to the embodiment in a pre-assembling state.
Figure 1B:
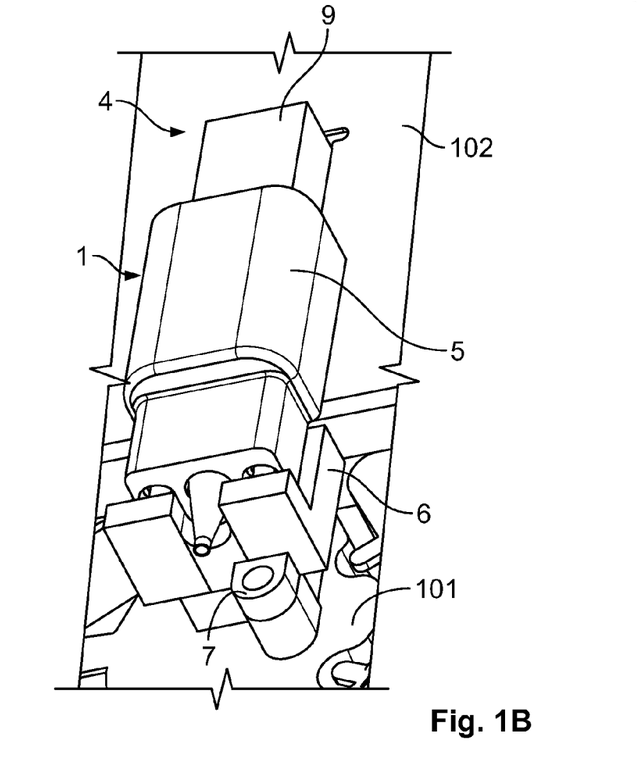
FIG. 1B shows a perspective top view of a fibre optic connector assembly comprising the positioning means shown in FIG. 1A in an assembled state.

FIG. 1A is a perspective top view of a fibre optic connector assembly comprising the positioning means according to the embodiment in a pre-assembling state and FIG. 1B shows the fibre optic connector assembly comprising the positioning means in the assembled state. The fibre optic connector assembly comprises the positioning means 1 designated in the following as the first positioning means 1 and a second positioning means 4 opposed to the first positioning means 1. In the preferred embodiment, the first positioning means 1 is adapted to receive a plug assembly 2 receiving a plug ferrule 3 accessible from one side thereof and the second positioning means 4 is provided for receiving a jack assembly 40 (see FIG. 5) receiving a jack ferrule 41 (see FIG. 5) connectable to the plug ferrule 3 from its accessible side by connection of the first positioning means 1 and second positioning means 4. Alternatively, the first positioning means 1 can be provided for receiving the jack assembly with the jack ferrule and the second positioning means 4 can be provided for receiving the plug assembly with the plug ferrule. The first and second positioning means 1, 4 are aligned in the pre-assembling state substantially coaxially. The first positioning means 1 comprises a stationary support 6 and a receiving means 5 supported by said stationary support 6. A detailed description of the stationary support 6 and the receiving means 5 of the first positioning means 1 is given with reference to FIGS. 2A to 6 below. The stationary support 6 comprises a fixation section 7 for screw or bolt mounting the first positioning means 1 on a first base 101 of a fibre termination unit which is described in detail with reference to FIGS. 7 to 9.

The receiving means 5 is guided by two spring loaded elements being compression springs 8 provided parallel to each other between the stationary support 6 and the receiving means 5 and to a forward position in the pre-assembling state. The first positioning means 1, aligned substantially coaxially with the second positioning means 4, is adapted to receive with its receiving means 5 a jack assembly holding means 9 provided with the second positioning means 4 and being fixed to a second base 102. The insertion of the jack assembly holding means 9 into the receiving means 5 is conducted by pushing together the first base 101 and the second base 102 as shown in FIG. 1B. Thereby, the receiving means 5 is guided to move backwards towards the stationary support 6 at most until the receiving means 5 abuts the stationary support 6 with the compression springs 8 sandwiched in between providing a fairly high compression force.

Figure 2A:
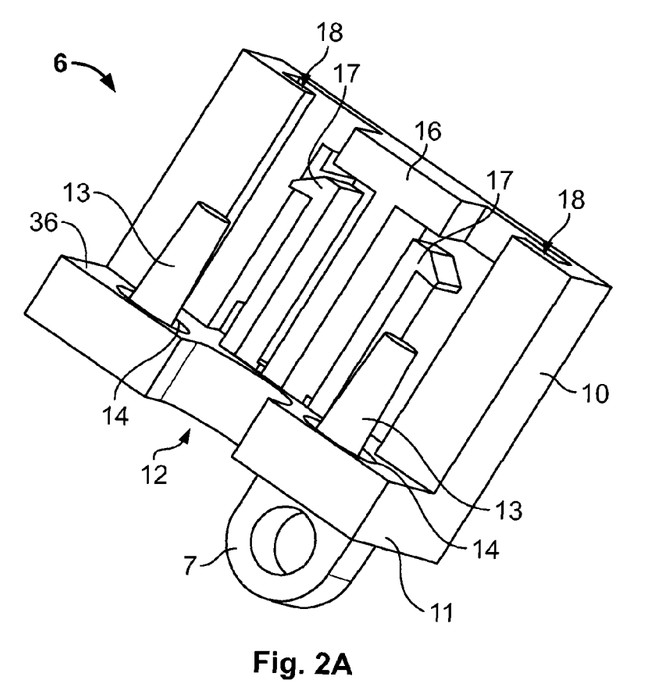
FIGS. 2A and 2B shows perspective top and bottom views of the stationary support of the positioning means shown in FIG. 1.
Figure 2B:
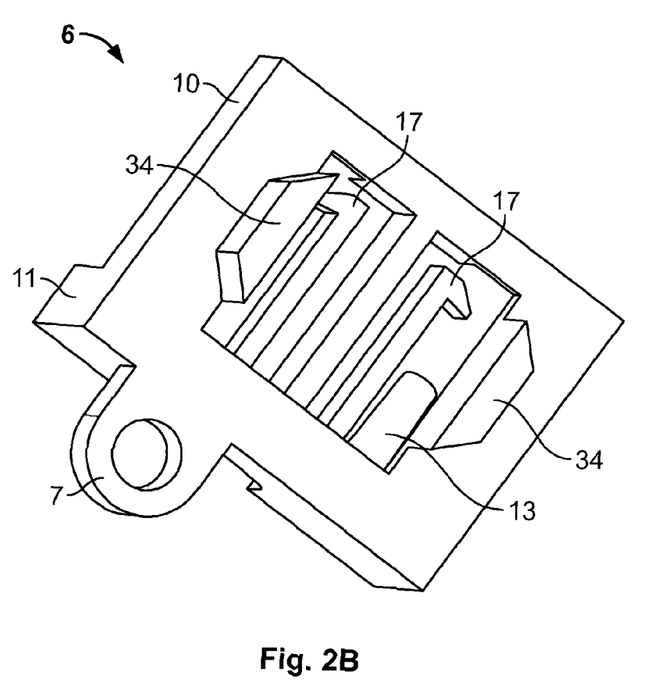

FIGS. 2A and 2B are perspective top and bottom views of the stationary support 6. The stationary support 6 has an L-shape from a side view with a first journal 10 running parallel to the connection axis and the second journal 11 running perpendicular thereto. The first and second journals 10, 11 are substantially plate shaped with a rectangular form, wherein said first and second journals 10, 11 extend in the plane of their running direction with a similar amount. Thus, the first and second journals 10, 11 have a similar width. On a side of the second journal 11 opposed to the first journal 10, the fixation section 7 protrudes parallel to the connection axis from the second journal 11. The fixation section 7 has a through hole for receiving a screw or bolt for fixing the stationary support 6. The second journal 11 has in its extension direction at a center position a first U-shaped recess 12 for guiding the optical fibre cable with the optical fibre element received in the plug assembly 2. On the side of the first journal 10 and adjacent to the first U-shaped recess 12, two conical protrusions 13 are provided which project from said side with a predetermined length parallel to the first journal 10. Each conical protrusion 13 is surrounded by a ring-shaped recess 14 and is provided to support the compression spring 8 by extending therethrough (compare FIG. 5). Inside a first abutment surface 15, the recess 14 provides for abutting one end side of the compression spring 8. The first abutment surface 15 runs perpendicular to the plane comprising the first journal 10. In said plane and adjacent to the recess 12 in a cross-sectional center plane of the second journal 10, a T-shaped protrusion 16 projects from the second journal 11 with a length larger than the projection length of the conical protrusions 13, wherein a free end surface of the T-shaped protrusion 16 corresponds to an end surface of the stationary support 6. Arranged on both sides of said T-shaped protrusion 16 and adjacent thereto is a latch 17 which projects from the second journal 10 in the plane of the first journal 10. The latches 17 are arranged in an area covered by the T-shaped protrusion 16 when viewed from its free end side, wherein only the latch part of the latch 17 protrudes from said covered area towards a lateral side of the stationary support 6 as particularly shown in FIG. 6. Adjacent to the latch 17 at the lateral sides of the stationary support 6 a first key and slot structure 18 of a U-shape is formed, wherein the opening of the U-shaped first key and slot structure 18 faces the latch 17. Said first key and slot structure 18 projects from the second journal 11 with a length equal to the length of the T-shaped protrusion 16. The outer surface of the bottom side of the U-shaped key and slot structure 18 constitutes the lateral side surface of the stationary surface 6. The first key and slot structures 18 on both lateral sides of the stationary support 6 are connected to each other by one journal of the U-shaped key and slot structure 18 which ranges from one lateral side to the opposite lateral side of the stationary support 6 perpendicular to the extension direction of the first journal 10. The other journal and the opening of the first key and slot structures 18 enclose the T-shaped protrusion 16 and the latches 17 in between. This configuration allows a very compact structure of the stationary support 6.

As can be seen from FIG. 2B, the stationary support 6 comprises a pair of support journals 34 projecting from a bottom surface side and being arranged opposed to each other with a predetermined distance therebetween. As further described with respect to FIG. 6, said support journals 34 with part of the bottom surface side of the stationary support 6 as an abutment surface, and the fixation section 7 prevent a displacement of the stationary support 6 in any directions.

Figure 3A:
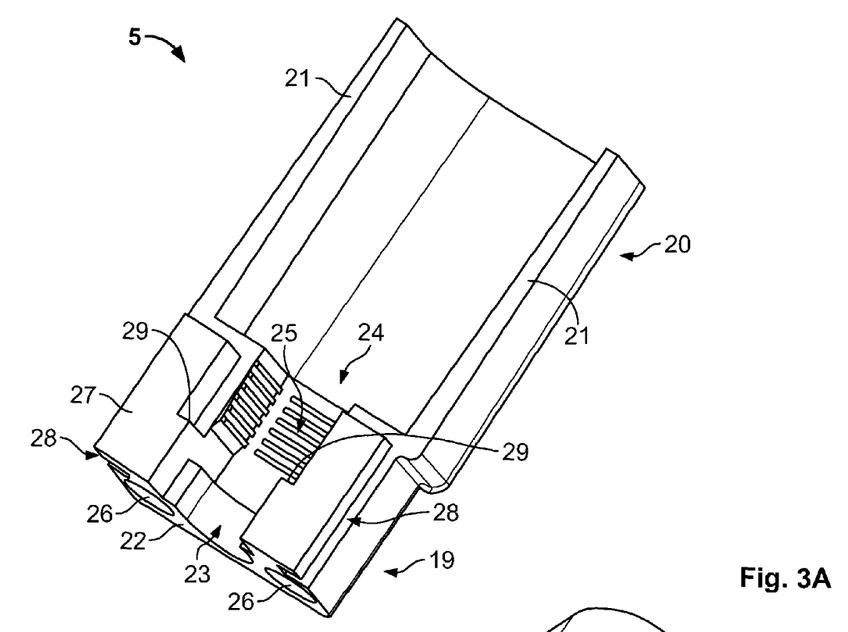
FIGS. 3A and 3B show perspective bottom and top views of the receiving means of the positioning means shown in FIG. 1.
Figure 3B:
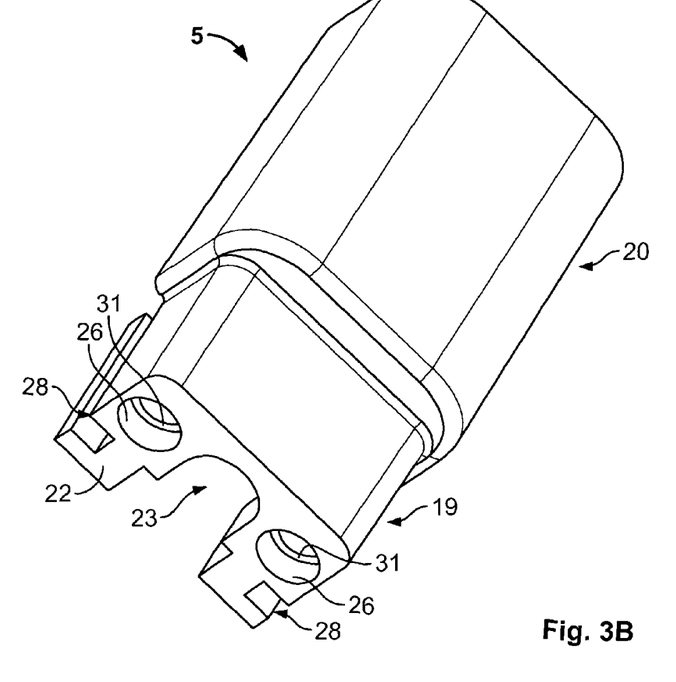

FIGS. 3A and 3B are perspective bottom and top views of the receiving means 5 which comprises a first part 19 for holding the plug assembly 2 and which cooperates with the stationary support 6, and a second part 20 projecting said first part 19 with a length larger than a length of the first part 19 along the connection axis. An outer width of the first part 19 in a direction perpendicular to the extension direction is substantially equal to an inner width of the second part 20 in the same direction. The first and second parts 19, 20 have a common bottom surface 21 along the connection axis defining a lateral contour thereof. A height ranging from the bottom surface 21 to a top surface side of the first part 19 is smaller than a height ranging from the bottom surface 21 to a top surface side of the second part. In addition, the second part 20 is dome-shaped. Hence, a step is formed at a change over of the first part 19 to the second part 20. The first part 19 comprises an abutting surface 22 at a free end side of the first part 19 which faces an abutting surface 36 of the stationary support 6 in an assembled state. The abutting surface 22 of the receiving means 5 has substantially a shape similar to the abutting surface 36 of the stationary support 6. At a center portion of the first part 19 a second U-shaped recess 23 is formed with its opening directed to the bottom side of the receiving means 5. The second U-shaped recess 23 is provided to interact with the first U-shaped recess 12 in such a manner that the optical fibre cable is guided through both recesses 12, 23 along the connection axis into a passageway 24 formed at a bottom of the first part 19 directly adjacent to the second U-shaped recess 23 and extending parallel to the connection axis. The passageway 24 is formed in the bottom of the first part 19 with a depth larger than a depth of the second U-shaped recess 23, thereby forming a step at the change-over. The passageway 24 comprises holding means 25 in form of a contoured surface arranged opposite to each other and adapted to receive the plug ferrule 3 at a center portion thereof for holding the plug assembly 2 which has a similar contoured surface at the sides opposing said holding means 25. Particularly, the contoured surface comprises a plurality of small bars spaced apart from each other by a predetermined distance and extending at the sides surrounding the passageway 24 in circumferential direction. The plug assembly 2 is inserted into the passageway 24 from the bottom side of the first positioning means 1, wherein said plurality of bars secures the plug assembly 2 along the connection axis. The plurality of bars interacts with a surface side of the T-shaped protrusion 16 facing the plug assembly 2 by providing a support surface for the plug assembly 2 in the vertical direction of the first positioning means 1. Furthermore, the first part 19 comprises two receiving holes 26 formed adjacent to the second U-shaped recess 23 and to the passageway 24 and extending parallel to the connection axis. The receiving holes 26 are positioned correspondingly to the conical protrusions 13 of the stationary support 6 for receiving them. Moreover, an L-shaped protrusion 27 projects from the common bottom surface 21 at each lateral side of the first part 19 and extends parallel to the connection axis from the second abutment surface 22 to the second part 20, wherein said L-shaped protrusion 27 with the bottom surface 21 forms a second U-shaped key and slot structure 28 with the opening directing to the lateral outer sides of the first part 19 for engaging said first key and slot structure 18 of the stationary support 6. The U-shaped key and slot configurations 28 arranged at the lateral sides of the first part 19 face each other with their outer bottom surface side, respectively. The outer bottom surface side is formed of a step 29 as a stop means for engaging the latch 17 of the stationary support 6, respectively, thereby preventing a slipping off of the receiving means 5 from the stationary support 6. Thus, a distance is formed between the opposing second key and slot configurations 28 along the connection axis from the second abutment surface 22 to the step 29 smaller than a distance between the opposing second key and slot configurations 28 along the connection axis from the step 29 to the second part 20. The step 29 is formed at a position of the holding means 25.

Figure 4:
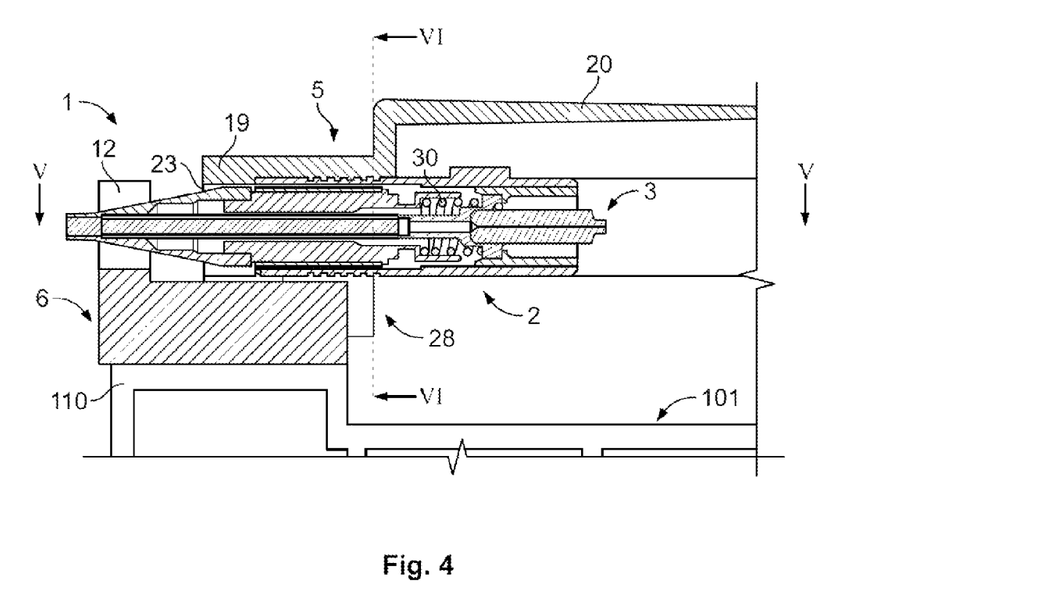
FIG. 4 shows a longitudinal sectional view of the positioning means shown in FIG. 1.

FIG. 4 is a longitudinal sectional view of the first positioning means 1 with the stationary support 6 supporting the receiving means 5 moved to the forward position. The receiving means 5 receives the plug assembly 2 having the plug ferrule 3. The plug assembly 2 is of a conventional type which comprises a spring 30 inside a plug housing 32 for urging the plug ferrule 3 to a forward position. The plug assembly 2 extends in the first part 19 and the second part 20 of the receiving means 5, wherein the optical fibre cable comprising the optical fibre element is guided along the connection axis through the first and second U-shaped recesses 12, 23 of the stationary support 6 and the receiving means 5, respectively. An outer side of the plug assembly 3 projecting into the second part 20 is spaced from an inside surface of the second part 20. Furthermore, the second part 20 projects a free end of the plug ferrule 3, whereby the second part forms a cover 20 for the free end of the plug assembly 2.

Figure 5:
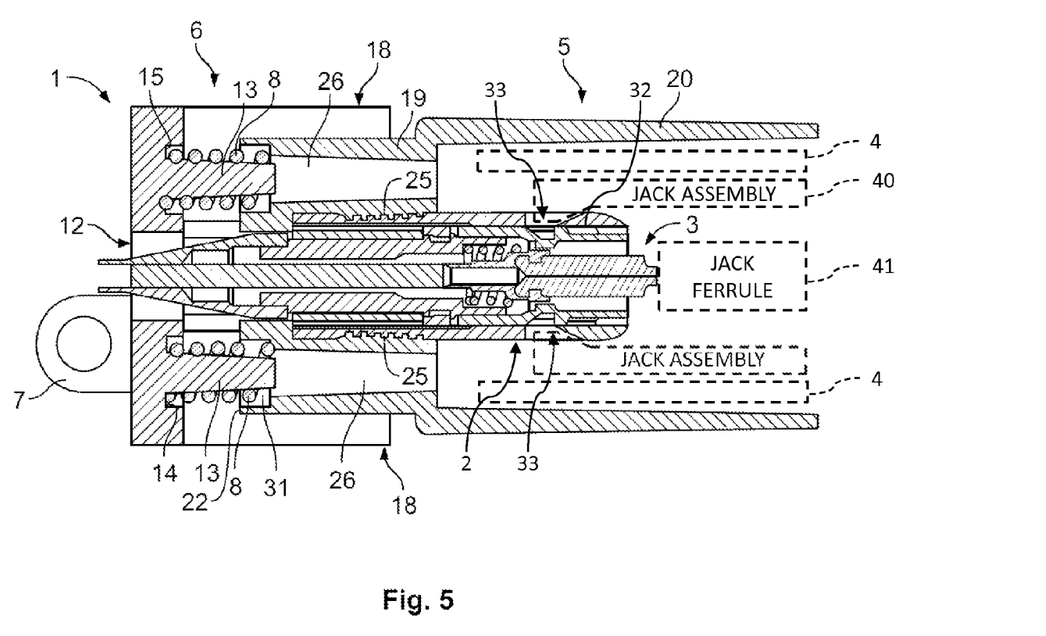
FIG. 5 shows a longitudinal sectional view along the intersection line V-V of the positioning means shown in FIG. 4.

Furthermore, as shown in FIG. 5, which is a longitudinal sectional view along the intersection line V-V as shown in FIG. 4, the compression spring 8 is arranged between the stationary support 6 and the receiving means 5, wherein one end of the compression spring 8 is received in the ring-shaped recess 14 and in the receiving hole 26. The receiving hole 26 is formed as a through hole extending through the first part 19 and comprises at the abutting surface 22 side a first part with an inner diameter larger than an inner diameter of a second part of the receiving hole 26 extending from said first part in the longitudinal direction of the first positioning means 1. The first part has a depth selected such that, in a forward position of the receiving means 5, a free end of the conical protrusion 13 is received in the first part of the receiving hole 26 which extends into its second part. The change over between the first and second part of the receiving hole 26 forms an abutment for the other end of the compression spring 8, wherein the compression spring 8 resiliently guides the receiving means 5 towards the forward position at which the latch 17 engages the step 29, thereby forming a stop means. The receiving hole 26 is formed of a conical shape corresponding to the shape of the conical protrusion 13. Accordingly, at the forward position of the receiving means 5, the free end of the conical protrusion extending into the second part of the receiving hole 26 is spaced apart from the inside surface of said second part, whereby a gap surrounding the free end of the conical protrusion 13 is formed there between. Said gap, in combination with a gap formed by the first and second key and slot structures 18, 28 as described in detail below, allows a displacement of the receiving means 5 along a direction transversal to the connection axis. Furthermore, the receiving means 5 is movable backwards in the direction towards the stationary support 6 to the rear position of the receiving means 5 by an amount determined by the distance provided between the abutting surface 22 and the opposing abutting surface 36 of the stationary support 6. Said distance corresponds to tolerances of the fibre optic connector along the connection direction for compensating them. Accordingly, a misalignment of the positioning means 1, 4 along the direction of the connection axis can be thus compensated.

As additionally shown in FIG. 5, the plug assembly 2 comprises a plug housing 32 having a detent recess 33 for receiving a detent latch provided with the jack housing of the jack assembly 40 for securing the optical interconnection of the optical fibre elements received in the assemblies, respectively. For effecting the latching connection of the plug assembly 2 to the jack assembly, a specific latching force is required, wherein the spring load of the compression springs 8 is set higher than said latching force. Accordingly, when the first positioning means 1 is connected to the second positioning means 4 by pushing the first base 101 on which the first positioning means 1 and the second base 102 on which the second positioning means is stationary installed together, a connection between the plug assembly 2 and the jack assembly is performed at first before the receiving means 5 will move backwards towards the stationary support 6. This ensures that the plug assembly 2 and the jack assembly provide a reliable optically interconnection between the received optical fibre elements.

Figure 6:
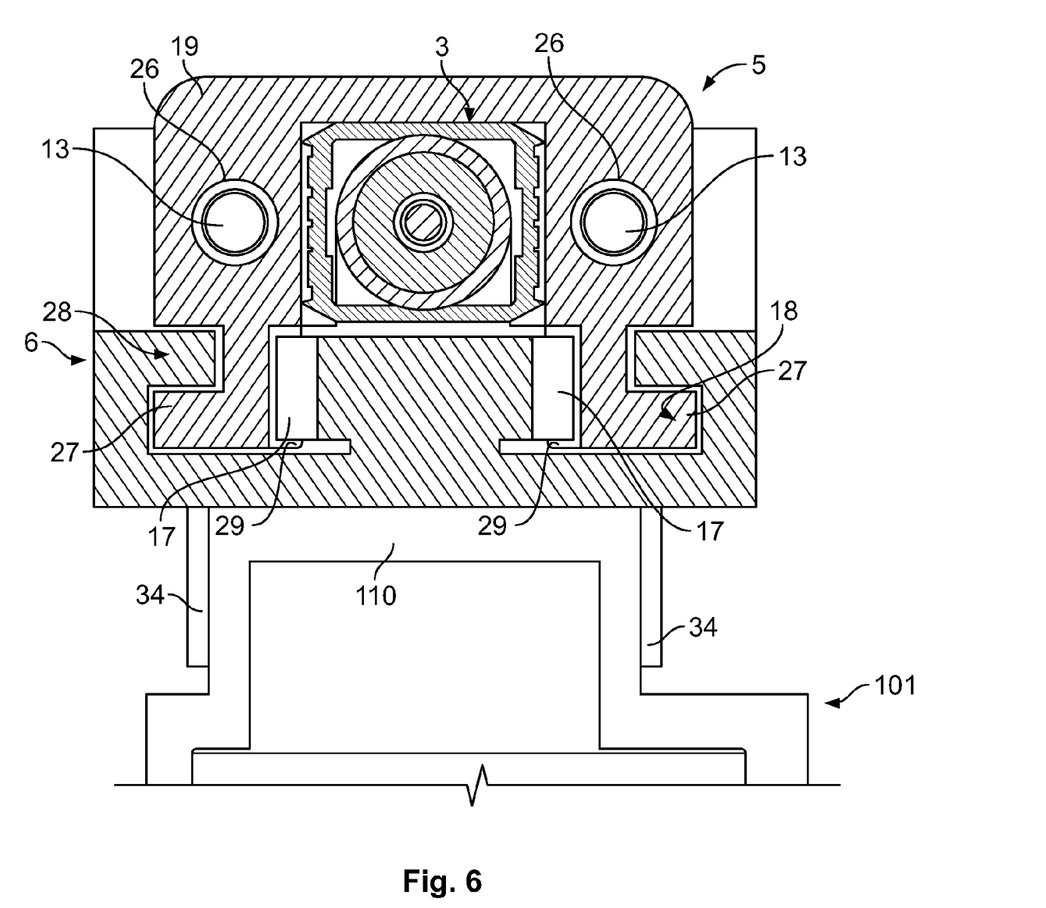
FIG. 6 shows a cross-sectional view along the intersection line VI-VI of the positioning means shown in FIG. 4.

FIG. 6 is a cross-sectional view along the intersection line VI-VI as shown in FIG. 4. The stationary support 6 is mounted on a support plate 110 of the first base 101, wherein the pair of support journals 34 extend from the bottom surface side of the stationary support 6. The support journals 34 are spaced from each other by a distance for enclosing the support plate 110 in between. Due to this configuration, the stationary support 6 is reliably fixed on the first base 101 as a pressing force on the stationary support 6 caused by a movement of the receiving means 5 in respective directions which can be absorbed further to the screw or bolt fixation by the abutment of the support journals 345 against the sides of the support plate 110. Even though the stationary support 6 is described as a single part fixed on the first base 101, said stationary support 6 can be formed integrally with the first base 101.

FIG. 6 shows in detail the support as provided by the stationary support 6. The stationary support 6 comprises a first U-shaped key and slot structure 18 which engages the corresponding second key and slot structure 28 of the receiving means 5. A small gap is formed between each pair of opposing non-contact surfaces, i.e. between a key and the corresponding slot of said first and second key and slot structures 18, 28, respectively. Accordingly, in combination with the gap formed between the conical protrusion 13 and the receiving hole 26 as described above, the receiving means 5 is displaceable transversal to the connection axis by the extent determined by the gap. A displacement amount, i.e. the size of the respective gap of the receiving means 5 is selected such that a misalignment of the opposing positioning means 1, 4 in all directions transversal to the connection axis can be absorbed, i.e. the extent of the displacement required can be determined by the tolerances caused e.g. by the manufacturing process of the fibre optic connector assembly and parts on which said fibre optic connector assembly is mounted. Moreover, in combination with the movable characteristic of the receiving means 5 along the connection axis, the tolerances, i.e. the misalignment in said direction can be likewise compensated, whereby the fibre optic connector assembly is suited to deal with misalignments occurring in all directions caused by tolerances.

Figure 7:
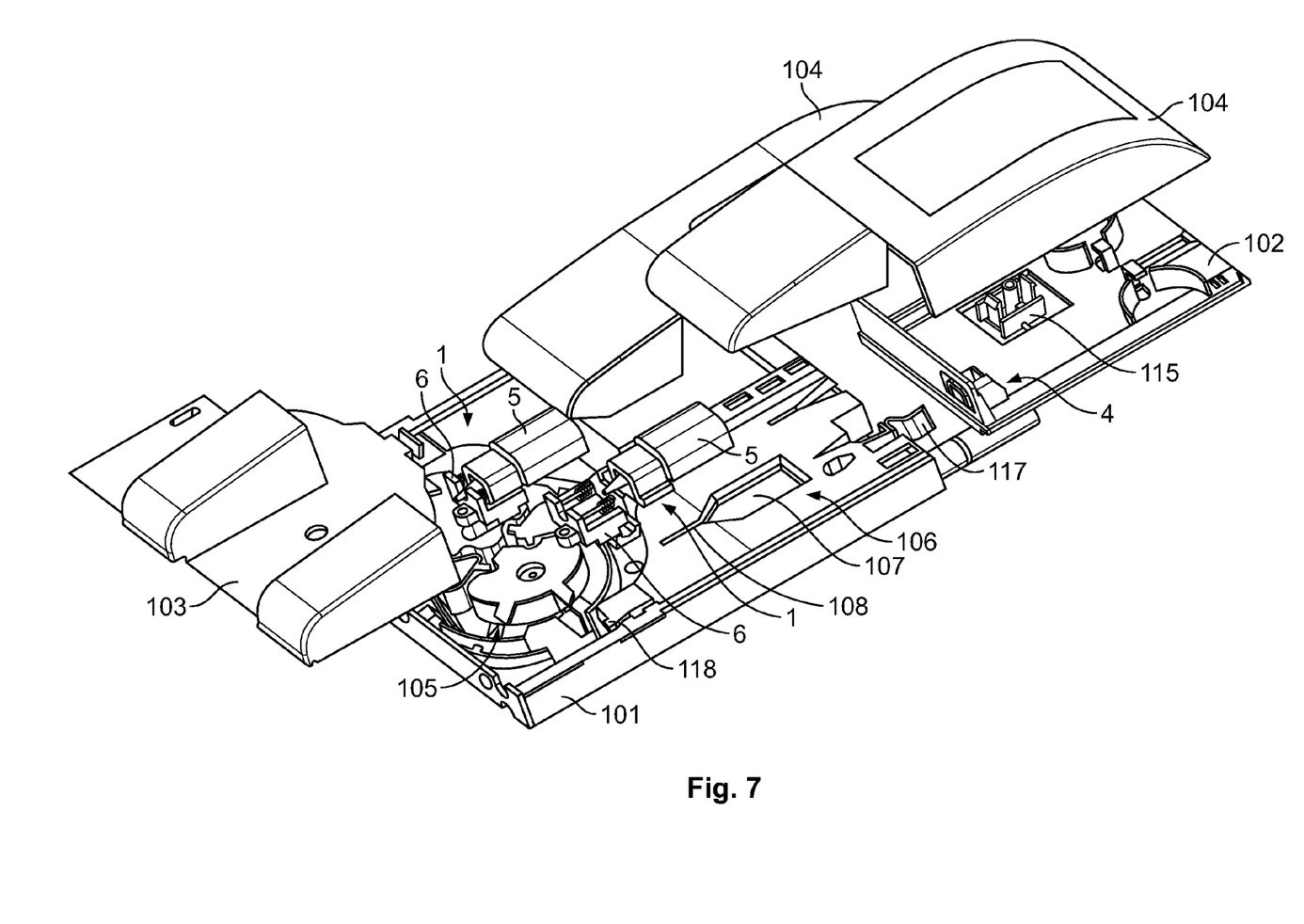
FIG. 7 shows a perspective exploded top view of a fibre termination unit with a fibre optic connector assembly comprising the positioning means.

FIG. 7 is a perspective exploded top view of the fibre termination unit 100 according to the embodiment of the present invention. The fibre termination unit 100 comprises the first base 101, two second base 102, a first base cover 103 for covering the first base 101 and two second base covers 104 for covering the respective second base 104 and part of the first base 101 covered by the first base cover 103. The first base 101 and second base 102 are formed by injection molding and have substantially a plate shape with a rectangular form. The second base 102 can be alternatively made of a printed circuit board comprising a plurality of electronic components. The first base 101 comprising a receiving section 106 receives the second base 102 from one end in said receiving section 106. The receiving section comprises base receiving means formed of a bottle-shaped recesses 107 having a bottle neck 108 for receiving base sliding means 109 formed on a bottom surface side of the respective second base 102 which is opposed to the side comprising the second positioning means 4, wherein said bottle-shaped recess 107 extends longitudinally in parallel to the connection axis, thereby providing a sliding direction for the second base 102 parallel to the connection axis.

At the opposed end, the first base 101 comprises a passage 106 for an incoming optical fibre cable and an optical fibre organizing section 105 for organizing the incoming optical fibre cable comprising the optical fibre element received within a jacket (not shown). The optical fibre organizing section 105 comprises a loop section and an optical fibre splice connector holder section. The optical fibre organizing section 105 also accommodates two first positioning means 1, wherein the stationary support 6 is fixed to the first base 101 on the support plate 110 by force fit means comprising the screw or bolt inserted into the fixation section 7 and into a receiving hole 118 of the first base 101. The optical fibre organizing section 105 and the first positioning means 1 are covered by the first cover 103.

Figure 8A:
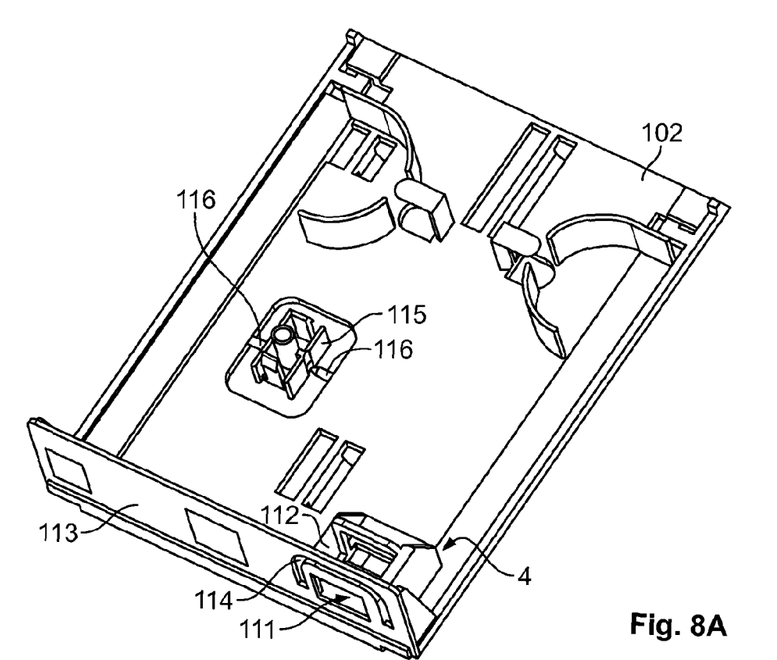
FIGS. 8A and 8B show perspective top and bottom views of the second base of the fibre termination unit.
Figure 8B:
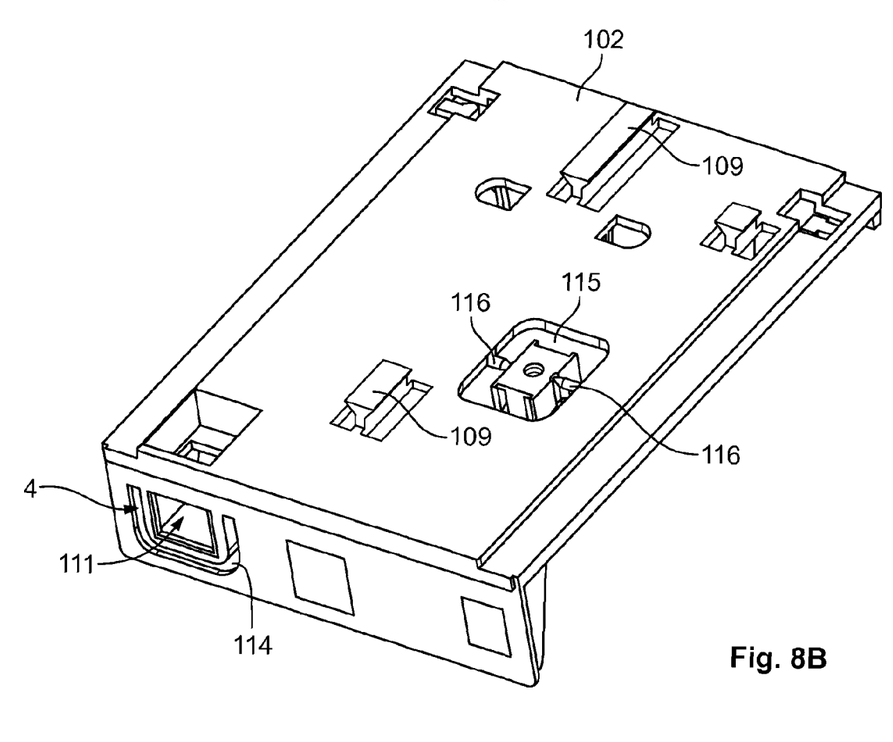

FIGS. 8A and 8B are perspective top and bottom views of the second base 102, respectively. The second base 102 comprises the second positioning means 4 in its corner region, wherein the second positioning means 4 is substantially frame shaped. The second positioning means 4 is formed of two U-shaped profiles of a similar size which are arranged on the second base 102 parallel to each other with a predetermined distance in between. Further, the plane comprising the U-shape of the profiles extends perpendicular to the connection axis to provide a channel 111 in the connection axis for receiving the jack assembly holding means 9. The lateral sides of the channel 111 extending parallel to the connection axis are closed by wall sections, respectively, which connect the respective journals of the U-shaped profiles at said lateral sides of the channel 111, wherein the upper side of the second positioning means 4, which is the far side with respect to the second base 102, has an opening for providing an access to the inside of the second positioning means 4. Further, as can be seen from FIG. 8B, the second base 102 comprises an opening at the place of the second positioning means 4 through which the channel 111 is further accessible from a bottom side of the second base 102. In other words, the channel 111 is accessible from the side which extends transversal to the connection axis and additionally from an upper and lower side of the second positioning means 4. Each wall section with the thereto connected journal of the respective profile forms at each lateral inner side of the second positioning means 4 a fillet indentation 112 for receiving a latch of the jack assembly holding means 9, thereby fixing the jack assembly holding means with the jack assembly to the second base 102 along the connection axis. A cross section of the second positioning means 4 corresponds to the cross-sectional shape of the cover 20 of the receiving means 5, wherein said second positioning means 4 provides a guide means for guiding the cover 20 in the connection direction. In particular, the cross-sectional shape of the inside surface of the cover 20 matches the cross-sectional shape of the outside surface of the second positioning means 4. The height and width of the second positioning means 4 along the directions orthogonal to the connection axis corresponds to a height and width of the inside of the cover 20. Furthermore, the second base 102 comprises, at the end side opposing the first base 101, a wall section 113 projecting perpendicular from the surface side of the second base 102 comprising the second positioning means 4. The wall section 113 has an opening 114 accommodating accessibly an end of the second positioning means 4 on the side facing the first base 101. Thereby, the wall section 113 surrounds the second positioning means 4, specifically the wall section 113 surrounds the U-shaped profile provided in the plane of the wall section 113, wherein the opening 114 has a form matching the cross-sectional shape of a wall forming the cover 20. In a connection step of the first positioning means 1 to the second positioning means 4, a free end of the cover 20 is coaxially aligned by displacement to match the opening 114. The cover 20 is then inserted into the opening 114, wherein the cover 20 is moved slidably and guided along the connection axis on the second positioning means 4 until connection of the plug assembly 2 to the jack assembly. During the movement, the cover 20 is held along the direction orthogonal to the connection direction by the wall section 113 forming the opening 114.

The second base 102 also comprises a protecting cover 115 for protecting in case of need an open end of the jack assembly. The protecting cover 115 is accommodated in a recess formed in the second base 102, wherein the protecting cover 115 is accessible from the side of the second base 102 comprising the second positioning means 4 and wherein the opposed side of the protection cover 115 forms with the corresponding side of the second base 102 a flush surface. The protecting cover 115 is fixed to the second base 102 through small bridges 116 extending from a side of the protecting cover 115 to a rim of the second base 102 forming the recess. By breaking said small bridges 116, the protecting cover 115 can be separated from the second base 102 and attached to the open end of the jack assembly. Alternatively, the open end of the jack assembly can be attached to the protecting cover 115 without releasing it from the second base 102.

The second base 102 has an optical fibre cable loop section 117 arranged on the surface side comprising the second positioning means 4 in an area near to the far away end of the second base 102 with respect to the first base 101. Accordingly, the second base 102 comprises the second positioning means 4, the protecting cover 115 and the optical fibre cable loop section 117 in said order along the connection axis from the near end to the far end of the second base 102 with respect to the first base 101.

As can be seen in FIG. 8B, the second base 102 at its bottom surface side comprises the base sliding means 109 formed of a plurality of hammer-head-shaped protrusions 109 projecting from said bottom surface side. The hammer-head shaped protrusions 109 are arranged at positions corresponding to the bottle-shaped recess 107 with the bottle neck 108 of the first base 101. Due to this configuration, when the second base 102 is mounted on the first base 101, the hammer-head protrusions 109 are inserted into the bottle-shaped recess 107. Thereby, the first and positioning means 1, 4 with the plug assembly 2 holding the plug ferrule 3 and the opposing jack assembly holding the jack ferrule are pre-aligned coaxially.

Subsequently, the first base 101 and/or the second base 102 is moved slidably along the connection axis towards the other base, wherein the neck of the hammer-head shaped protrusions 109 are moved near to the bottle neck 108 of the bottle-shaped recess 107. Accordingly, a further pre-alignment of the positioning means 1, 4, the plug assembly, the jack assembly, the plug ferrule 3 and the jack ferrule with respect to the respective corresponding parts is conducted. Then, before or simultaneously with a further movement of the first base 101 and/or the second base 102 towards the other base, the cover 20 is aligned to the opening 114 and inserted therein with its free end side. Thus, a fine alignment of the positioning means 1, 4, the plug assembly 2, the jack assembly, the plug ferrule 3 and the jack ferrule with respect to its corresponding part is performed. With the subsequent movement of the first base 101 and/or second base 102 towards each other, the plug assembly 2 is connected to the jack assembly by engagement of the detent latch of the jack assembly with the detent recess 33 of the plug assembly 2, wherein the plug ferrule 3 is inserted into the jack ferrule for performing optical interconnecting of the optical fibre elements received by said ferrules. In an end position of the second base 102 with respect to the first base 101, i.e. by abutment of the hammer-head shaped protrusion 109 with an end rim of the bottle neck 108, the receiving means 5 is moved nearer to its rearward position and is biased by the compression springs 8 under a predetermined load against the second positioning means 4. Thereby, the first and second positioning means 1, 4 are fixed to each other along the connection axis. Said fixation is further supported by securing the second base 102 on the first base 101 by securing means formed of a latch 117 as described with respect to FIG. 9. In addition, a width of the recess formed by the bottle neck 108 perpendicular to the connection axis corresponds to a thickness of the neck of the hammer-head shaped protrusions 109. Accordingly, the hammer-head shaped protrusions 109 overlap with its hammer head end the bottle neck 108 on the bottom surface side of the first base 101, thereby retaining the second base 102 on said first base 101 along the direction perpendicular thereto.

A lateral side of the second base 102 running parallel to the connection axis comprises an abutment surface with a plane parallel to the bottom surface of the second base 102 and is separated therefrom by a step extending parallel to the connection axis. Said abutment surface and said step are provided to abut a corresponding abutment surface and step of a second base 102 to arrange at least two second base 102 side by side.

Figure 9:
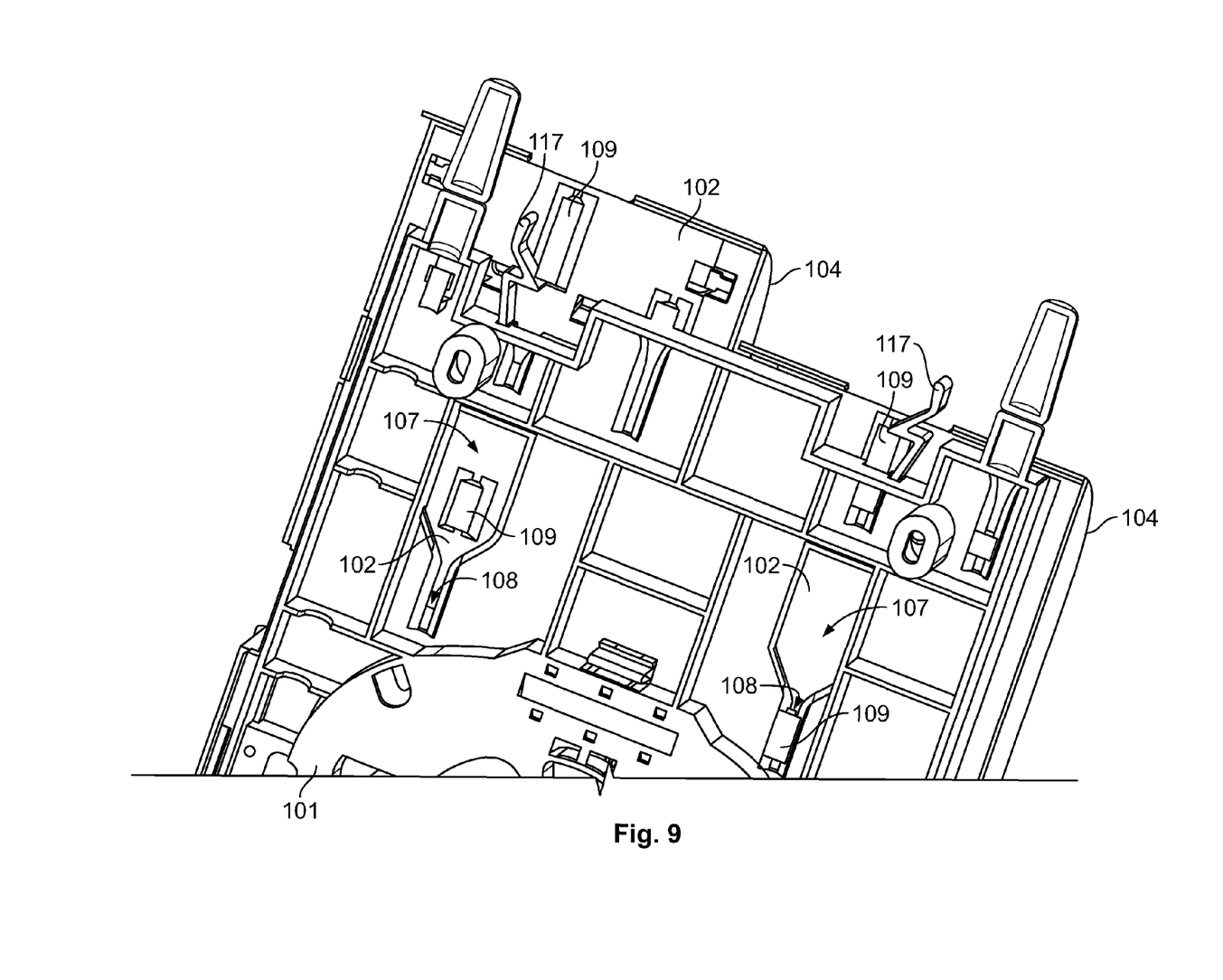
FIG. 9 shows a perspective bottom view of the fibre termination unit shown in FIG. 7.

FIG. 9 is a perspective bottom view of the fibre termination unit with a first second base 102 installed on the first base 101 in a state in which the neck of the hammer-head protrusions 109 is received by the bottle neck 108 but just before a securing state of the second base 102 to the first base 101 is achieved. Adjacent to the second base 102 a further second base 102 is shown in a state in which the hammer-head shaped protrusions 109 are inserted in the bottle shaped recess 107 and before said protrusions 109 are moved into the bottle neck 108. The first base 101 comprises two releasable and flexible first base latches 117 for securing the second base 102 in the assembled state to the releasable first base 101 along the connection axis. The first base latch 117 are provided at the insertion end side of the first base 101 where the second base 102 is installed on the first base 101. The first base latch 117 is basically L-shaped with a sloped latch part at the end of the L-form extending in a diagonal manner to the connection axis and providing a guide for a front insertion end of a further protrusion 109 arranged at a rear end of the second base 102 with respect to the insertion direction. After the hammer-head shaped protrusions 109 are inserted into the bottle-shaped recess 107, and when the second base 102 is moved forward to the first base 101, the front end of the additional protrusion 109 abuts the sloped part of the first base latch 117 and bends the first base latch 117 to a direction orthogonal to the connection axis. When the sloped part of the first base latch 117 reaches a rear end of the further protrusion 109, the first base latch 117 retracts behind said rear end and secures the second base 102 to the first base 101. By bending the sloped part of the first base latch 117 again in the direction orthogonal to the connection direction, the second base 102 can be released from the first base 101.

According to the configuration of the fibre termination unit, an optical fibre cable coming from a provider side and arranged on the first base can be simply connected to a second base connected to an electrical loop or an optical fibre loop feeding, for example, a dwelling unit such as an apartment. Further, if optical fibre cables of different providers shall be connected, said connection can be provided within a single fibre termination unit without interfering the connection of an already installed second base by providing for each optical fibre cable to be connected a single second base which is connectable and releasable from the fibre termination unit separately with respect to the remaining one.

The invention claimed is:

1. A positioning means for a fibre optic connector assembly which comprises a plug assembly receiving a plug ferrule and a jack assembly receiving a jack ferrule connectable to the plug ferrule such that said plug ferrule and said jack ferrule are positionable coaxially with respect to each other for optically interconnecting optical fibers supported by said plug ferrule and said jack ferrule; the positioning means comprises a receiving means having an open end to receive one of the jack assembly and the plug assembly and a stationary support supporting said receiving means, wherein said receiving means is displaceable relative to the stationary support at least along a direction transverse to a connection direction for optically interconnecting the optical fibers to allow an alignment of the one of the jack assembly and the plug assembly along the direction transverse to the connection direction, said receiving means being translatable relative to the stationary support in the direction transverse to the connection direction, the stationary support means being positioned proximate a second end of the receiving means opposite the open end, wherein the stationary support has a first abutment surface and the receiving means has a second abutment surface, the first and second abutment surfaces run transversal to the connection direction and facing each other with a spring loaded element sandwiched in between.

2. The positioning means according to claim 1, wherein said receiving means is further displaceable relative to the stationary support along the connection direction.

3. The positioning means according to claim 2, wherein said stationary support and said receiving means enclose the spring loaded element which resiliently urges said receiving means along the connection direction and away from the stationary support, wherein said stationary support comprises a stop means, and wherein the spring loaded element urges the receiving means in a spring loaded state against the stop means in a distal end position.

4. The positioning means according to claim 1, wherein said stationary support comprises a first key and slot structure extending parallel to the connection direction and said receiving means comprises a second key and slot structure engaging said first key and slot structure with a predetermined gap between opposing surfaces of corresponding keys and slots.

5. The positioning means according to claim 1, wherein said receiving means comprises a first part which is adapted to hold one of the jack assembly or plug assembly and which cooperates with said stationary support, and a second part projecting said first part towards a free end of the displaceable positioning means.

6. The positioning means according to claim 5, wherein said second part is a cover adapted to project a free end of the ferrule of the one of the jack assembly or plug assembly held by the first part and to be spaced therefrom by a certain distance in a direction transversal to the connection axis.

7. A positioning means for a fibre optic connector assembly which comprises a plug assembly receiving a plug ferrule and a jack assembly receiving a jack ferrule connectable to the plug ferrule such that said plug ferrule and said jack ferrule are positionable coaxially with respect to each other for optically interconnecting optical fibers supported by said plug ferrule and said jack ferrule; the positioning means comprises a receiving means having an open end to receive one of the jack assembly and the plug assembly and a stationary support supporting said receiving means, wherein said receiving means is displaceable relative to the stationary support at least along a direction transverse to a connection direction for optically interconnecting the optical fibers to allow an alignment of the one of the jack assembly and the plug assembly along the direction transverse to the connection direction, the stationary support means being positioned proximate a second end of the receiving means opposite the open end, wherein said receiving means is further displaceable relative to the stationary support along the connection direction, the stationary support including conical projections extending along the connection direction, the conical projections being received by the receiving means.

8. A fibre optic connector assembly comprising:
a first positioning means for a plug assembly receiving a plug ferrule, and
a second positioning means opposing the first positioning means and being provided to receive a jack assembly receiving a jack ferrule connectable to the plug ferrule by connection of said first and second positioning means such that said plug ferrule and said jack ferrule are positionable coaxially with respect to each other for optically interconnecting optical fibers supported by said ferrules;
wherein at least one of the first and second positioning means is formed of a positioning means comprising a receiving means having an open end to receive one of the jack assembly and the plug assembly and a stationary support supporting said receiving means, wherein said receiving means is displaceable relative to the stationary support at least along a direction transverse to a connection direction for optically interconnecting the optical fibers to allow an alignment of the one of the jack assembly and the plug assembly along the direction transverse to the connection direction, said receiving means being translatable relative to the stationary support in the direction transverse to the connection direction, the stationary support means being positioned proximate a second end of the receiving means opposite the open end, wherein the stationary support has a first abutment surface and the receiving means has a second abutment surface, the first and second abutment surfaces run transversal to the connection direction and facing each other with a spring loaded element sandwiched in between.

9. A fibre optic connector assembly comprising:
a first positioning means for a plug assembly receiving a plug ferrule, and
a second positioning means opposing the first positioning means and being provided to receive a jack assembly receiving a jack ferrule connectable to the plug ferrule by connection of said first and second positioning means such that said plug ferrule and said jack ferrule are positionable coaxially with respect to each other for optically interconnecting optical fibers supported by said ferrules;

wherein at least one of the first and second positioning means is formed of a positioning means comprising a receiving means having an open end to receive one of the jack assembly and the plug assembly and a stationary support supporting said receiving means, wherein said receiving means is displaceable relative to the stationary support at least along a direction transverse to a connection direction for optically interconnecting the optical fibers to allow an alignment of the one of the jack assembly and the plug assembly along the direction transverse to the connection direction, said receiving means being translatable relative to the stationary support in the direction transverse to the connection direction, the stationary support means being positioned proximate a second end of the receiving means opposite the open end, wherein said jack assembly and said plug assembly each comprises latching means insertable to each other for retaining the plug assembly in the jack assembly, wherein the spring loaded element sandwiched by the receiving means and the stationary support provides a spring load higher than a latching force for effecting a latching connection of the plug assembly (2) to the jack assembly.

\* \* \* \* \*